US011853282B2

(12) United States Patent
Kedia et al.

(10) Patent No.: US 11,853,282 B2
(45) Date of Patent: Dec. 26, 2023

(54) GAINING INSIGHTS ON DATABASE SYSTEM TABLE CHANGES

(71) Applicant: International Business Machines Corporation, Armonk, NY (US)

(72) Inventors: Pravin Kailashnath Kedia, Deonar (IN); Shailesh Chandra Jamloki, Noida (IN)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 17/643,448

(22) Filed: Dec. 9, 2021

(65) Prior Publication Data

US 2023/0185789 A1    Jun. 15, 2023

(51) Int. Cl.
| G06F 16/22 | (2019.01) |
| G06F 16/23 | (2019.01) |
| G06F 11/34 | (2006.01) |
| G06F 16/2455 | (2019.01) |
| G06F 16/2453 | (2019.01) |

(52) U.S. Cl.
CPC ...... *G06F 16/2282* (2019.01); *G06F 11/3409* (2013.01); *G06F 16/2358* (2019.01); *G06F 16/24539* (2019.01); *G06F 16/24565* (2019.01)

(58) Field of Classification Search
CPC .................................................. G06F 16/2282
USPC ........................................................ 707/802
See application file for complete search history.

(56) References Cited

U.S. PATENT DOCUMENTS

| 6,279,008 B1 * | 8/2001 | Tung Ng ............... G06F 16/289 |
| | | 707/999.102 |
| 10,055,459 B2 * | 8/2018 | Baranczyk ........ G06F 16/24565 |
| 10,331,778 B1 | 6/2019 | Greenbaum |
| 10,922,301 B1 * | 2/2021 | Biton ................... G06F 11/3476 |
| 10,942,913 B1 | 3/2021 | Khoyilar |
| 2003/0187848 A1 * | 10/2003 | Ghukasyan ......... G06F 21/6227 |
| | | 707/999.009 |
| 2004/0039477 A1 * | 2/2004 | Kaever ............... G06F 11/0736 |
| | | 700/173 |
| 2004/0177319 A1 | 9/2004 | Horn |
| 2005/0246686 A1 | 11/2005 | Seshadri |
| 2006/0117050 A1 * | 6/2006 | John ....................... H04L 67/54 |
| 2014/0068718 A1 * | 3/2014 | Mureinik ................ G06F 21/53 |
| | | 726/4 |
| 2017/0091046 A1 | 3/2017 | Bangalore |
| 2017/0163651 A1 | 6/2017 | Povalyayev |

(Continued)

OTHER PUBLICATIONS

"Database Trigger", Wikipedia, The Free Encyclopedia, <https://en.wikipedia.org/wiki/Database_trigger>, last edited on Aug. 21, 2021, 7 pages.

(Continued)

*Primary Examiner* — Muluemebet Gurmu
(74) *Attorney, Agent, or Firm* — Stephen R. Yoder (57) ABSTRACT

Obtaining insights on how database system tables are evolving. In some instances, risk aware database system triggers that have read only access to the columns of interest are utilized, thereby allowing a user to fully study the changes made to the database system tables while maintaining the security and integrity of these database system tables. Additionally, these database system triggers can be used to audit changes that are happening on the database system tables using views.

18 Claims, 6 Drawing Sheets

(56) References Cited

U.S. PATENT DOCUMENTS

2017/0286518 A1\* 10/2017 Horowitz ............... G06F 11/14
2017/0322993 A1    11/2017 Brodt

OTHER PUBLICATIONS

"Event Notifications", Microsoft Documentation SQL Docs, Mar. 14, 2017, <https://docs.microsoft.com/en-us/sql/relational-databases/service-broker/event-notifications?view=sql-server-ver15>, 6 pages.

"Smart trigger feature", Help—HCL Informix V14.10 documentation, <https://informix.hcldoc.com/14.10/help/index.jsp?topic=%2Fcom.ibm.jdbc.doc%2Fids_jdbc_st_01.htm>, printed Sep. 13, 2021, 1 page.

Pajama, "Informix Smart Trigger", Informix Hoarder, <https://blog.daum.net/ipajama/651>, printed Sep. 13, 2021, 7 pages.

"Patent Cooperation Treaty PCT Notification of Transmittal of the International Search Report and the Written Opinion of the International Searching Authority, or the Declaration", Applicant's file reference IEE220976PCT, International application No. PCT/CN2022/123794, International filing Oct. 8, 2022, dated Dec. 22, 2022, 9 pages.

\* cited by examiner

| pg_replication_slots 1 ✕ | | | | | | | |
|---|---|---|---|---|---|---|---|
| ⌁ select slot_name,plugin,slot_type,active,active_pid,xmir ↗↙ Enter a SQL expression to filter results (use Ctrl+Space) | | | | | | | |
| slot_name | plugin | slot_type | active | active_pid | xmin | catalog_xmin | restart_lsn | confirmed_flush_lsn |
| SS | test_decoding | logical | false | | | 27627102 | 0/F95033D0 | 0/F95033F0 |

Grid

Text

GAINING INSIGHTS ON DATABASE SYSTEM TABLE CHANGES

BACKGROUND

The present invention relates generally to the field of databases, and more particularly to the use of database system tables in a large-scale enterprise environment.

The Wikipedia entry for "Table (database)" (as of Sep. 13, 2021) states as follows: "A table is a collection of related data held in a table format within a database. It consists of columns and rows. In relational databases, and flat file databases, a table is a set of data elements (values) using a model of vertical columns (identifiable by name) and horizontal rows, the cell being the unit where a row and column intersect. A table has a specified number of columns, but can have any number of rows. Each row is identified by one or more values appearing in a particular column subset . . . . The data in a table does not have to be physically stored in the database. Views also function as relational tables, but their data are calculated at query time. External tables . . . can also be thought of as views . . . . Conceptually, it is a list of records or observations all containing the same fields or columns. The implementation consists of a list of arrays or vectors, each with a name."

SUMMARY

According to an aspect of the present invention, there is a method, computer program product and/or system that performs the following operations (not necessarily in the following order): (i) receiving, from a first database, a database system table, with the database system table including substantive data of a first system, metadata of the first system, and a system trigger; (ii) creating, by a user, a system table view, with the system table view being a sub-set of the entire database system table, and with the sub-set being chosen based on the user's viewing permissions; (iii) creating, by the user, a restricted proxy, with the restricted proxy being a trigger that is structured and configured to dynamically track changes made to the database system table; (iv) determining, by the restricted proxy, that a set of changes made to the system table include a number of events that exceed a first events threshold; (v) responsive to the determination that the set of changes exceeds the first events threshold, determining, by the restricted proxy, the substantive content of the set of changes shown in the system table view; and (vi) responsive to the determination of the substantive content of the set of changes, generating a set of insights for the user based, at least in part, upon the substantive content of the set of changes shown in the system table view.

According to an aspect of the present invention, there is a method, computer program product and/or system that performs the following operations (not necessarily in the following order): (i) determining whether a first system table is being updated; (ii) determining whether the first system table that is being updated has a system trigger; (iii) responsive to the determination that the first system table has a system trigger, generating an updated tuple; and (iv) responsive to the generation of the updated tuple, updating the system table.

DETAILED DESCRIPTION

Some embodiments of the present invention are directed towards obtaining insights on how database system tables are evolving. In some instances, risk aware database system triggers that have read only access to the columns of interest are utilized, thereby allowing a user to fully study the changes made to the database system tables while maintaining the security and integrity of these database system tables. Additionally, these database system triggers can be used to audit changes that are happening on the database system tables using views.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
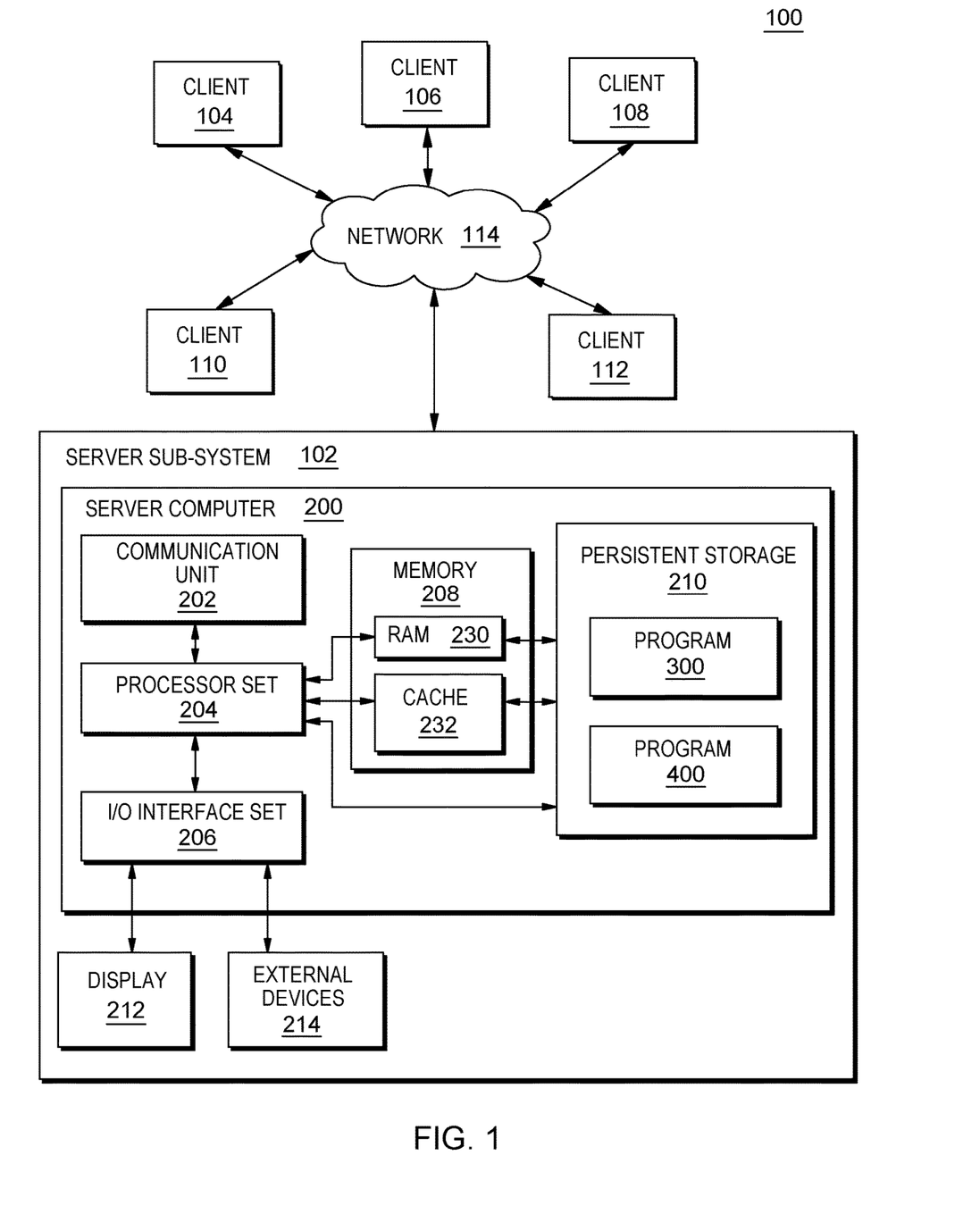
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 and Program 400 are stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 and Program 400 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
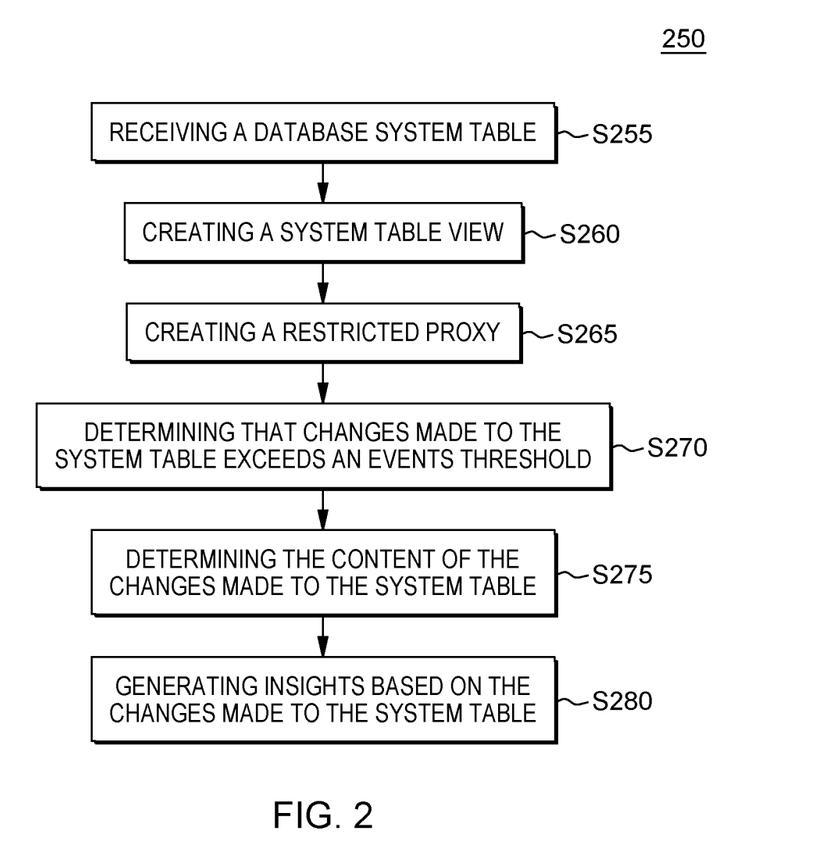
FIG. 2 is a flowchart showing a first embodiment of a method performed, at least in part, by the first embodiment system.
Figure 3:
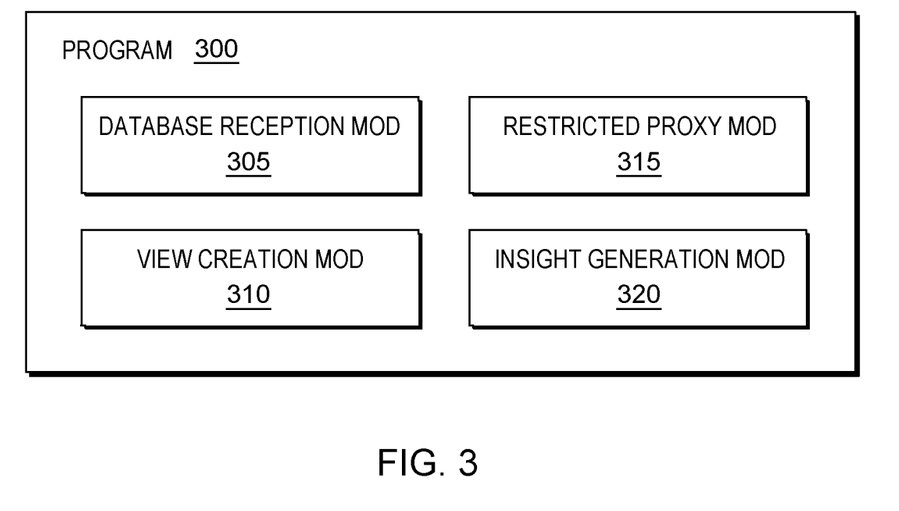
FIG. 3 is a first block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where database reception module ("mod") 305 receives a database system table (or multiple database system tables) from a first database. In some embodiments, this database can be a relational database. Additionally, in some embodiments, the database system table includes both substantive data with respect to a given subject and metadata.

Processing proceeds to operation S260, where view creation mod 310 creates a system table view. In some embodiments, the user can create a system table view (also sometimes referred to simply as a "view" or "views"), which is a logical window that displays a system table. The user can create this view based upon several factors, including the nature of the task being performed and/or monitored by the database table and the security permissions that the user may have in order to perform his or her task.

Processing proceeds to operation S265, where restricted proxy mod 315 creates a restricted proxy (that is, mod 315 creates a customized system trigger to track changes made to the database system table). In this document, the terms "restricted proxy" and "system trigger" can be used interchangeably. In some embodiments, the restricted proxy is used to actively monitor changes that are made to the database system table as a whole and any substantive changes that are made to the system view after it has been created.

Processing proceeds to operation S270, where the restricted proxy (discussed in connection with operation S265, above) determines that the number of changes made to the database system table exceeds an events threshold. As part of its role in monitoring changes made to the database system table, the restricted proxy also tallies a log of events (or changes) that are made to the database system table in a pre-defined period of time. In some embodiments, the events threshold defines the minimum number of events (or changes to the system table) that must occur in a given period of time before an action is triggered. This events threshold can be set by the user based upon the task upon which he or she is performing. Alternatively, the events threshold can be dynamically adjusted by the system based on the type of task being performed and/or monitored.

Processing proceeds to operation S275, where the restricted proxy (discussed in connection with operation S265, above) determines what the substantive content of the changes made to the database system table includes. In some embodiments of the present invention, when the number of events (or changes to the system table) exceed the events threshold, the restricted proxy will then keep a log of the specific changes that are made to the system table that are shown in the system view (that is, only the relevant changes that the user needs to see will be shown to him or her by the restricted proxy).

Processing finally proceeds to operation S280, where insight generation mod 320 generates insights based upon the substantive changes made to the database system table. In some embodiments of the present invention, these generated insights include: (i) learning why a given database is suddenly slow, learning why the given database has suddenly crashed, determining when a DR setup is occurring, replaying database changes and observing how the given database is evolving, estimating and planning for imminent high processing load(s) and high-volume transactions, and determining enough information to diagnose any current problems with the given database.

III. Further Comments and/or Embodiments

Generally, database system tables are only available for viewing purposes for system views, and these views play an important role in understanding the current state of the database. Views are typically defined as a subset of actual database table(s) that can be used for viewing a full table or a subset of a table. Views are typically used to give users limited access to sensitive data and prevent accidental manipulation of a database table, which can lead to major data loss.

Embodiments of the present invention provide a method and system by which insights on how the database system tables are evolving are obtained. These database system tables can be thought of as risk aware database system table/views with triggers that have read-only access to the changing patterns for the columns of interests. These triggers can be utilized to audit the changes happening on the system tables using views (as discussed above). Embodiments of the present invention describe the restricted and read only event notifications access to these insights on the system table changes that can be utilized for performance analysis, schema evolutions and audit change tracking.

In some embodiments, it can be assumed that there is a system table and/or views for which a user has access to and the user has a requirement to understand how the data is evolving over time. For example, the user might want to track the history of changes on the underlying structure of the table. In this scenario the user wants to view the changes happening on the data structure so that there is no risk of corrupting the database. However, there currently is not a way to do that.

There are five points that need to be addressed with respect to certain embodiments of the present invention: (1) System tables and/or views are not logged as changes in the archive logs so the user cannot track these views changes with respect to a replication product; (2) On system views, user triggers cannot be created, so there is no way users can track the changes happening on underlying data structure; (3) In most of the system views, the user is not necessarily aware of the actual underlying data structure. In this instance, it is difficult to poll the changes; (4) For polling the changes using third party applications (such as PLSQL or Java), threads using a time stamp column of a last updated value is not possible because most of these views or tables typically do not have this column; and (5) Existing mechanisms to generate these reports cannot be used because embodiments of the present invention are interested in the history of the record(s). For example, if there is a row that is getting updated regularly for one of the columns, and we want to see how that column value progress overtime, this information can only be found if the change notification is enabled.

In some embodiments, there is a need for a method and system to obtain insights on how the database system tables are evolving. This can be thought of as risk aware database system triggers that have read-only access to the columns of interest. These system triggers can additionally be utilized to audit the changes happening on the system tables using views. Embodiments of the present invention describe the restricted and read only event notifications access to these insights on the system table changes that can be utilized for performance analysis, schema evolutions, and audit change tracking.

Embodiments of the present invention provide a restricted proxy trigger (after event and read only). This is because the proxy trigger is on view and is synonymous with the actual system table. In some embodiments, the main reason to use this proxy trigger is because it is the only way to get an event notification of the change made to the system table(s).

In some embodiments, certain triggers can also be used to activate other triggers. Some embodiments of the present invention do not create user custom triggers for the system table and publish this as source code so that a given window can be closed. In some instances, triggers are also difficult to debug. Therefore, predefined triggers will allow (or set) other triggers to work which allows a user to specify the action that needs to be taken. Some embodiments will disallow this instead of having a trigger on the system tables because embodiments of the present invention do not allow for any changes of the actual DMLs and activates other alternative actions.

In order to solve this problem, embodiments of the present invention create a proxy trigger (as discussed above) to the system view with the same table definitions. For example, if there is a table showing information about an Employee, then the table will have the following columns: Employee Num, Name, Salary.

The resulting table will then have the following view:
EmployeeView
EmployeeNum, Name Embodiments of the present invention should be able to create trigger(s) for the system table for updating, and it should be triggered only when updates to visible columns are added. Similarly, on the insert/update operation, some embodiments are structured and configured to get event data only with the accessible column data.

With this information, some embodiments either create new tables with a change history or create an event notifications listener. This is sometimes considered as part of a separate application used to generate insights.

Embodiments of the present invention include the following novel points: (1) There is a system and method to create a proxy (read only) after event triggers on system table or views; (2) This method ensures that it is difficult or not possible to alter a system state. With this method, there are no security risks to the database systems because these systems are defined as restricted read-only triggers on system tables; (3) The system implements the created proxy (read-only) after triggers using the application event notification. This is novel because embodiments of the present invention use the standard triggers with few restrictions; and (4) The system is exposed to the end user using the following syntax: "alter system set gain_system_insights."

Consider the following: System Tables and System Views are the records whereas attributes and characteristics are information that is recorded.

If some embodiments of the present invention can start delegating to observe the changes to outside applications (such as the use of Artificial Intelligence (AI)), then it can do the following: (i) understand why a database is suddenly slow or why the most recent crash happened; (ii) understand when embodiments are doing a DR setup or replaying database changes as well as how the database is evolving; (iii) estimate and plan for upcoming high load(s) and high-volume transactions; and (iv) help diagnose any current problems.

This problem can be considered with the following analogy:

The after update trigger can be thought of as an Internet of Things (IoT) device on the system (in this case, on the database). It is continually emitting useful changes that can be observed to determine a given database state and how that database state is progressing. This can consist of well-planned out events for the database.

An additional use case is as follows:

There is a system view (such as pg_replication_slots) in PostgreSQL that maintains various database positions (such as restart_lsn and confirmed_flush_lsn) of each replication streaming slots. Here, there is one entry and/or row per replication slot. In this instance, there will be an update query performed whenever the position of the replication slot moves forward. Consumer applications of these replication slot changes can only confirm the position it has consumed (confirmed_flush_lsn) based on the database periodically updating the positions (such as restart_lsn). This "restart_lsn" position also tells the database not to archive the log with this restart_lsn because some slots have not been consumed after this position.

In one instance, if the user needs any updates on a particular slot, then the "restart_lsn" position can provide information relating to the monitoring of data that is being gathered and analyzed. Currently, there is not a way to perform this monitoring. Embodiments of the present invention provide a solution to this problem.

In another instance, if there are too many slots currently open, and even if one of the replication slots slows down and is left behind, then it can lead to a block log archival process that can cause the database to halt. In order to prevent this, embodiments of the present invention debug the actual cause of what and which slot is causing this slow progression of the "restart_lsn" position.

Another problem is that when the update of the restart_lsn position for the slot is performed by the system process, then only the end user can request confirmed_flush_lsn of the column (for example, the position the user has consumed for the replication stream). This makes the process to monitor the progress of the restart_lsn position more important.

Figure 8:
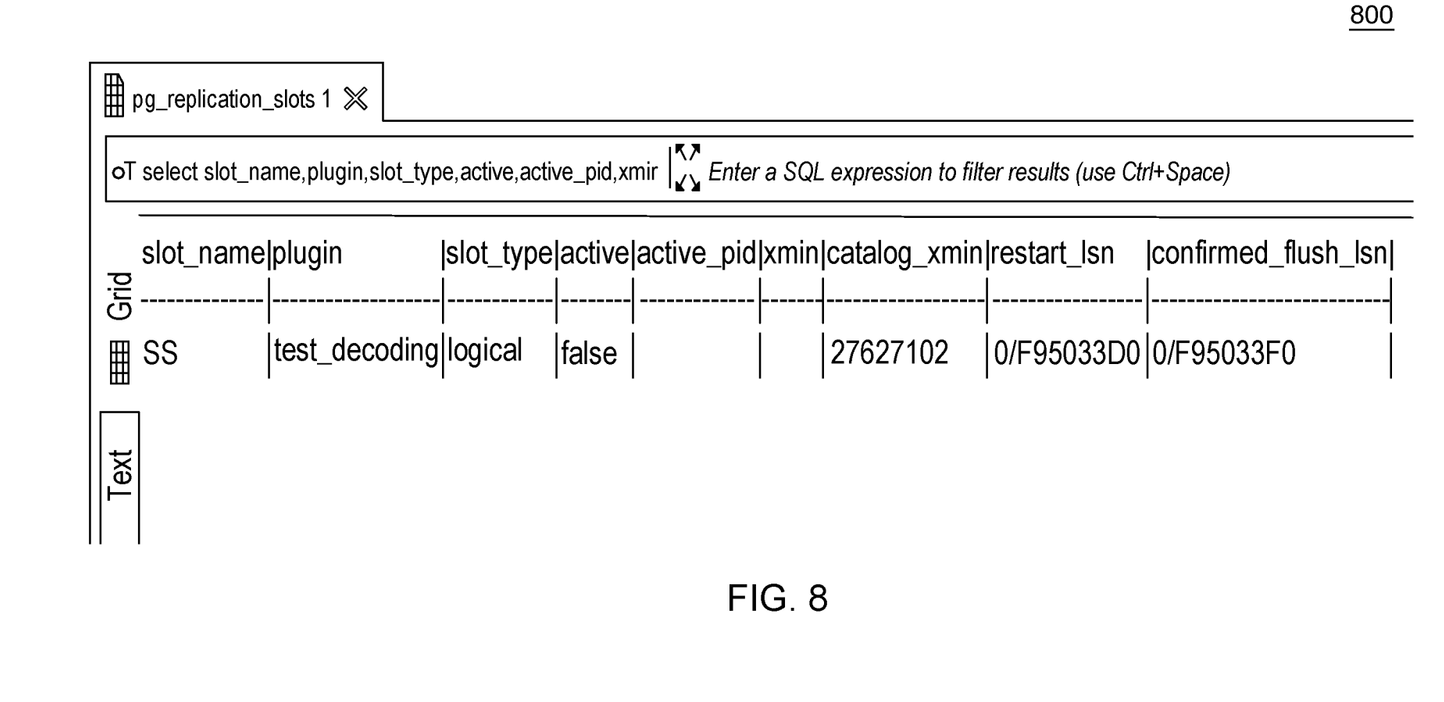
FIG. 8 is a screenshot view generated by the first embodiment system.

Implementing embodiments of the present invention enables the viewing of the progression of updates to restart_lsn and confirmed_flush_lsn, which is helpful to users. Additionally, screenshot 800 of FIG. 8 provides an exemplary view of a table according to embodiments of the present invention (as discussed above).

Figure 4:
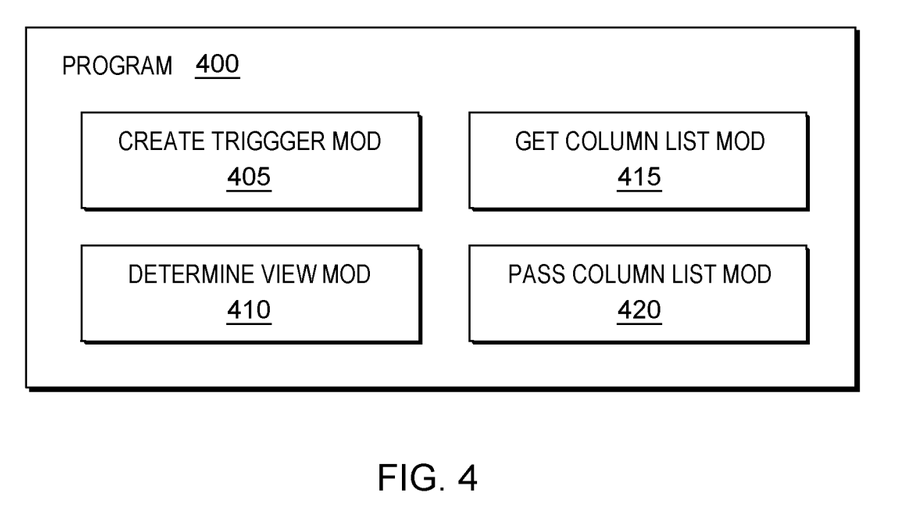
FIG. 4 is a second block diagram showing machine logic (for example, software) portion of the first embodiment system.
Figure 5:
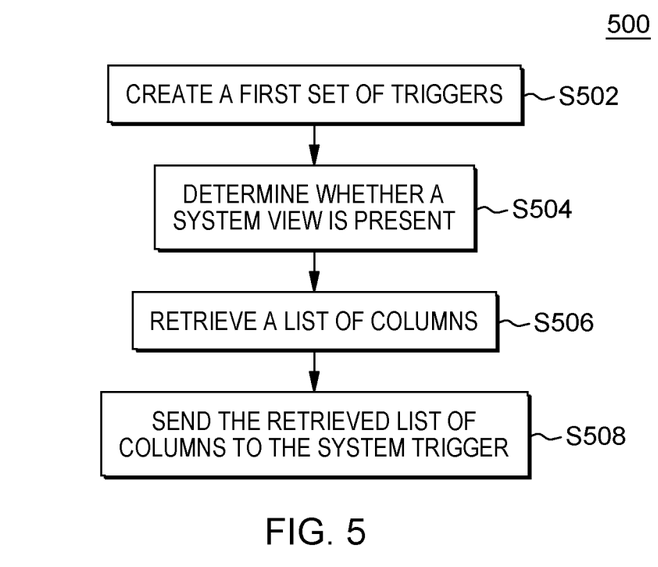
FIG. 5 is a flowchart showing a third embodiment method performed, at least in part, by the first embodiment system.

FIG. 5 shows flowchart 500 depicting a method according to the present invention. FIG. 4 shows program 400 for performing at least some of the method operations of flowchart 500. This method and associated software will now be discussed, over the course of the following paragraphs, with extensive reference to FIG. 5 (for the method operation blocks) and FIG. 4 (for the software blocks).

Processing begins at operation S502, where create trigger module ("mod") 405 creates a first set of triggers. The first set of triggers are used to track user tables, and in some instances, the set of triggers are referred to as a "restricted proxy." The restricted proxy can be enabled or disabled by the overall performance of the database, which can be determined in a number of ways. One manner in which the overall performance of the database can be measured is by setting a productivity threshold, which can be measured by the number of events that are generated by the database in a pre-defined period of time.

Processing proceeds to operation S504, where determine view mod 410 determines whether a system view is present for the database tables. In some embodiments, the system view is a logical window that shows a representation of a system table. In some embodiments of the present invention, the system view is read-only, which means that the table columns can only be queried and not deleted and/or modified.

Processing proceeds to operation S506, where get column list mod 415 retrieves a list of columns from the system view of the database table. In some embodiments, get column list mod 415 is structured and configured to automatically select a pre-defined sub-set of columns. Alternatively, get column list mod 415 selects columns based on user preference.

Processing finally proceeds to operation S508, where pass column list mod 420 sends the retrieved list of columns (discussed in connection with operation S506, above) to the system trigger from the first set of triggers (discussed in connection with operation S502, above). In some embodiments, passing the retrieved list of columns allows a user to set the rules for analyzing changes to the database table as well as accessing the scope of changes that are made.

Figure 6:
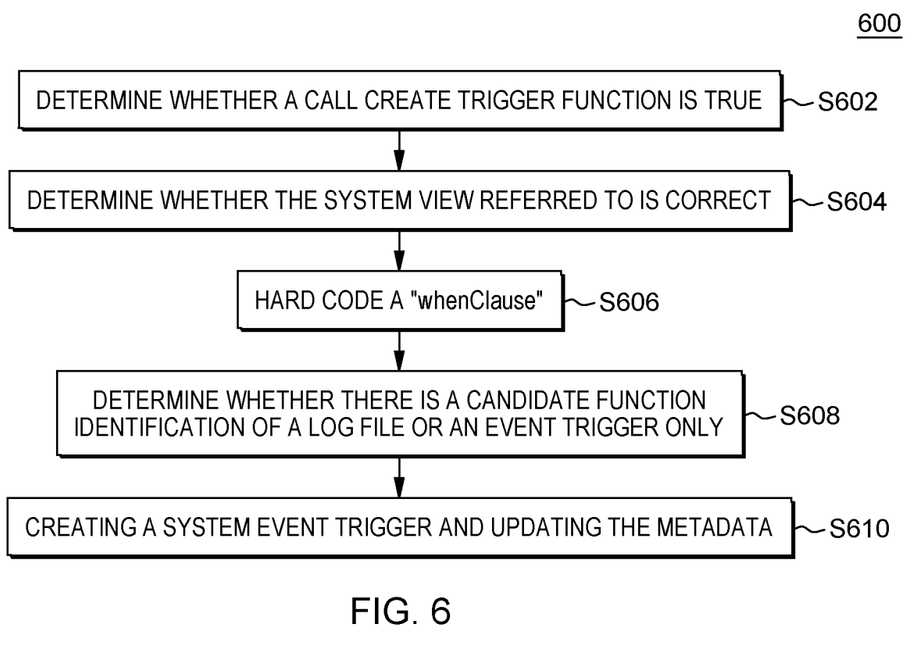
FIG. 6 is a flowchart showing a fourth embodiment method performed, at least in part, by the first embodiment system.

Flowchart 600 of FIG. 6 provides a method for implementing embodiments of the present invention. The method includes the following operations (and not necessarily in the following order): (i) determine whether a call create trigger function is true (operation S602); (ii) determine whether the system view that is referred to is correct (and that this reference essentially returns a value of "true") (operation S604); (iii) hard coding a "whenClause"—in some instances, the column list is hard coded based upon the system view, with the hard coding ignoring all of the parameters excepted for the function_id parameter (operation S606); (iv) determining whether there is a candidate function identification of a log file or an event trigger only (operation S608); and (v) creating a system event trigger and updating the metadata (operation S610).

Figure 7:
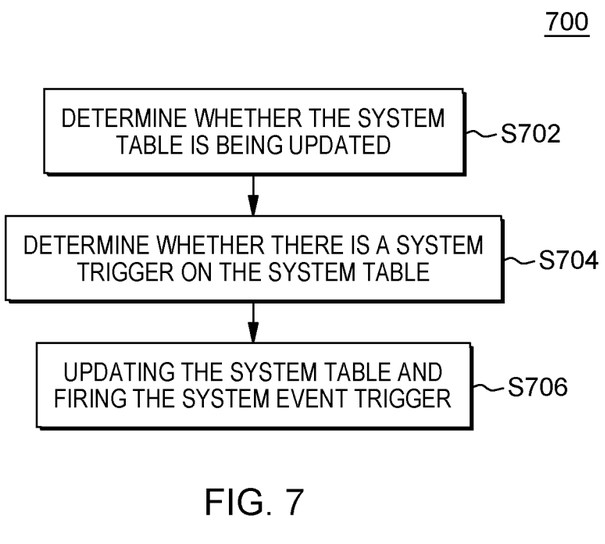
FIG. 7 is a flowchart showing a fifth embodiment method performed, at least in part, by the first embodiment system.

Flowchart 700 of FIG. 7 provides a method for implementing certain embodiments of the present invention. The method includes the following operations (and not necessarily in the following order): (i) determining whether the system table is being updated (operation S702); (ii) determining whether there is a system trigger on the system table (operation S704); and (iii) generating an updated tuple, updating the system table, and firing the system event trigger (operation S706).

Embodiments of the present invention recognize the following: (i) there are already ways to create triggers on views; (ii) the triggers need be created as restricted read-only system triggers that would not change the system state; (iii) using the existing create database trigger technology before creating the view (proxy) will verify which columns are to be created and what the proxy trigger scope is; (iv) based on this, the existing create trigger view function will be overloaded to take a set of columns for which tracking needs to be monitored for insights; (v) this read-only view will be able to provide tracking for the columns for which it needs to be triggered; (vi) for each trigger event, the list will be checked when it must be triggered, and it is based on the subscribed column of system table/view; and (vii) the sample SQL statements for the user are used generate these triggers.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving, from a first database, a database system table, with the database system table including substantive data of a first system, metadata of the first system, and a system trigger;
creating, by a user, a system table view, with the system table view being a sub-set of the entire database system table, and with the sub-set being chosen based on a set of viewing permissions associated with the user;
creating, by the user, a restricted proxy, with the restricted proxy being a trigger that is structured and configured to dynamically track changes made to the database system table;
determining, by the restricted proxy, that a set of changes made to the system table include a number of events that exceed a first events threshold;
responsive to the determination that the set of changes exceeds the first events threshold, determining, by the restricted proxy, substantive content of the set of changes shown in the system table view; and
responsive to the determination of the substantive content of the set of changes, generating a set of insights for the user based, at least in part, upon the substantive content of the set of changes shown in the system table view, with the set of insights including information predicting that the first database will imminently process a set of high-volume transactions.

2. The CIM of claim 1 wherein the database system table is a relational database table.

3. The CIM of claim 1 wherein the restricted proxy can be structured and configured to be disabled based, at least in part, upon the performance of the first database.

4. The CIM of claim 1 wherein the system table view is a logical window for the database system table.

5. The CIM of claim 1 wherein the system table view is created as a read-only view with the substantive content of the system table view being unalterable by the user.

6. The CIM of claim 1 wherein the set of insights generated allows the user to determine whether the first database is experiencing a process overload.

7. A computer program product (CPP) comprising:
a computer readable storage medium; and
computer code stored on the computer readable storage medium, with the computer code including instructions and data for causing a processor(s) set to perform operations including the following:
receiving, from a first database, a database system table, with the database system table including substantive data of a first system, metadata of the first system, and a system trigger,
creating, by a user, a system table view, with the system table view being a sub-set of the entire database system table, and with the sub-set being chosen based on a set of viewing permissions associated with the user,
creating, by the user, a restricted proxy, with the restricted proxy being a trigger that is structured and configured to dynamically track changes made to the database system table,
determining, by the restricted proxy, that a set of changes made to the system table include a number of events that exceed a first events threshold,
responsive to the determination that the set of changes exceeds the first events threshold, determining, by the restricted proxy, substantive content of the set of changes shown in the system table view, and
responsive to the determination of the substantive content of the set of changes, generating a set of insights for the user based, at least in part, upon the substantive content of the set of changes shown in the system table view, with the set of insights including information predicting that the first database will imminently process a set of high-volume transactions.

8. The CPP of claim 7 wherein the database system table is a relational database table.

9. The CPP of claim 7 wherein the restricted proxy can be structured and configured to be disabled based, at least in part, upon the performance of the first database.

10. The CPP of claim 7 wherein the system table view is a logical window for the database system table.

11. The CPP of claim 7 wherein the system table view is created as a read-only view with the substantive content of the system table view being unalterable by the user.

12. The CPP of claim 7 wherein the set of insights generated allows the user to determine whether the first database is experiencing a process overload.

13. A computer system (CS) comprising:
a processor(s) set;
a computer readable storage medium; and
computer code stored on the computer readable storage medium, with the computer code including instructions and data for causing the processor(s) set to perform operations including the following:
receiving, from a first database, a database system table, with the database system table including substantive data of a first system, metadata of the first system, and a system trigger,
creating, by a user, a system table view, with the system table view being a sub-set of the entire database system table, and with the sub-set being chosen based on a set of viewing permissions associated with the user,
creating, by the user, a restricted proxy, with the restricted proxy being a trigger that is structured and configured to dynamically track changes made to the database system table,
determining, by the restricted proxy, that a set of changes made to the system table include a number of events that exceed a first events threshold,
responsive to the determination that the set of changes exceeds the first events threshold, determining, by the restricted proxy, substantive content of the set of changes shown in the system table view, and
responsive to the determination of the substantive content of the set of changes, generating a set of insights for the user based, at least in part, upon the substantive content of the set of changes shown in the system table view, with the set of insights including information predicting that the first database will imminently process a set of high-volume transactions.

14. The CS of claim 13 wherein the database system table is a relational database table.

15. The CS of claim 13 wherein the restricted proxy can be structured and configured to be disabled based, at least in part, upon the performance of the first database.

16. The CS of claim 13 wherein the system table view is a logical window for the database system table.

17. The CS of claim 13 wherein the system table view is created as a read-only view with the substantive content of the system table view being unalterable by the user.

18. The CS of claim 13 wherein the set of insights generated allows the user to determine whether the first database is experiencing a process overload.

* * * * *